2,792,845
Patented May 21, 1957

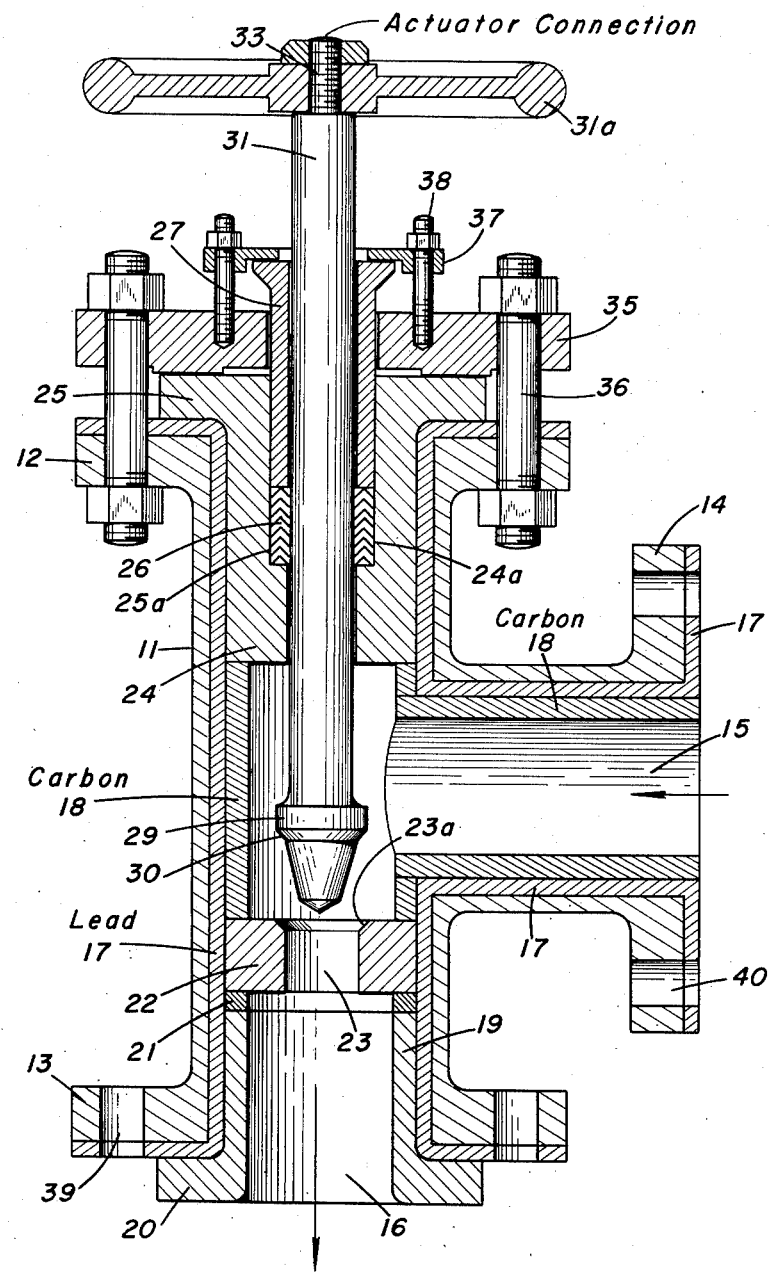

2,792,845

ACIDPROOF CONTROL VALVE

William C. Atherton, Newton O. Felps, and Carney B. Fletcher, Baytown, Tex., assignors, by mesne assignments, to Esso Research and Engineering Company, Elizabeth, N. J., a corporation of Delaware Application July 20, 1953, Serial No. 368,924

3 Claims. (Cl. 137—375)

The present invention has to do with an acid proof control valve. More particularly, the invention is concerned with a control valve for use in sulfuric acid systems. In its more specific aspects, the invention is concerned with a corrosion resistant valve suitable for use in sulfuric acid operations.

The valve may be described briefly as involving a T-shaped body member which is provided with an inlet and an outlet at right angles with each other. A corrosion resistant deformable metal lining is arranged in the valve to cover exposed surfaces of the non-corrosion resistant valve body and the corrosion resistant deformable metal lining is designed to extend over exposed surfaces of the valve. An abrasion and corrosion resistant porous liner is arranged over the deformable metal liner in the inlet and covering the deformable metal liner in the interior of the valve body. Arranged in the outlet of the valve body is a corrosion resistant metal annular sleeve which is in direct contact with the deformable metal liner. In contact with the annular sleeve is a plastically deformable packing ring and arranged on the packing ring is an annular valve seat of corrosion resistant metal provided with a passageway for passage of corrosive fluid from the valve body to the outlet. The annular valve seat has its lower surface in direct contact with the packing ring and has its upper surface in contact with the inner porous liner and its exterior surface in contact with the deformable metal liner. A second annular sleeve of corrosion resistant metal is arranged in an upper portion of the valve body to act as a stem guide and is out of the passageway from the inlet to the outlet with its exposed surfaces in the valve body in contact with the inner porous liner and the deformable metal liner. A valve plug is provided in the valve body which is adapted to seat in the valve seat. The valve plug has an extension member or stem, which may be integral with the plug, with a free end extending through the second annular sleeve to the outside of the valve body, the sleeve defining a space with the extension member. A packing member of a plastically deformable material is arranged in the space. The packing member surrounds the extension member and is in contact with the second annular sleeve. A third annular sleeve is arranged in the space in contact with the packing member and holds same in the recess. The valve body is provided with means for holding the second and third sleeves therein and the extension member may be provided with means for raising and lowering the valve plug by the extension member.

The T-shaped body member is constructed of a suitable metal to provide the proper strength for the valve. For example, a valve body constructed of cast carbon steel having flanges on the inlet and outlet has proved satisfactory. The deformable metal lining which is arranged to cover the exposed surfaces of the valve is a suitable corrosion resistant lining such as lead. Other corrosion resistant linings of deformable metal, such as lead and lead-containing alloys, may suitably be used. The corrosion resistant metal which is employed for the valve seat and the three annular sleeves employed in the present invention is suitably a sulfuric acid corrosion resistant alloy such as one known to the trade as Hastelloy D and Hastelloy C. Hastelloy D is substantially nickel with small amounts of silicon, copper and aluminum, while Hastelloy C comprises nickel, molybdenum, iron, copper and chromium. It is also possible to use corrosion resistant Duriron or Corrosiron for the plug, seat, and annular sleeves. These latter materials are high silicon iron alloys.

The plastic deformable packing which makes up the annular packing ring and the packing member may suitably be the material identified as "Teflon" which is manufactured by E. I. du Pont de Nemours and Company of Arlington, New Jersey. Teflon is a trademark applied to polytetrafluoroethylene. This material is substantially chemically inert and withstands the attack of most corrosive materials. It is plastically deformable and does not resist movement of the metal with respect thereto.

The invention will be further illustrated by reference to the drawing in which the single figure is a sectional view of a preferred embodiment.

Referring now to the drawing, numeral 11 designates a valve body having a T shape. The valve body 11 is provided with flanges 12 and 13 on opposite ends of the main section of the valve body and with a flange 14 on the valve body at right angles to the flanges 12 and 13. The valve body 11 defines an inlet passageway 15 and an outlet passageway 16 which is at right angles to the inlet 15. Bonded to the interior surface of the valve body 11 and extending over the flanges 12, 13 and 14 is a corrosion resistant liner 17 which is constructed of a deformable metal, such as lead or its alloys, which is resistant to corrosion by sulfuric acid at concentrations which rapidly attack carbon steel. It will be noted that the lead lining 17 extends through the interior of the T of the valve body 11 and covers the flanges and extends to the outer surfaces of the valve body.

The lead lining 17 is covered with a lining of carbon 18 which extends over the lead liner 17 in the inlet 15 and over the lead liner 17 in the interior of the valve body 18 in a path of flow from the inlet 15 to the outlet 16. The lead lining is thus protected from excessive temperature and abrasion.

A first annular sleeve 19 provided with a shoulder 20 is arranged in the outlet in direct contact with the lead liner 17. The sleeve 19 with its shoulder 20 rests on the lead liner 17 which extends over flange 13 and holds the seat 22 in place.

In contact with an upper surface of the annular sleeve 19 is a packing ring 21 which is suitably constructed of Teflon and acts as a buffer between the sleeve 19 and the seating member 22. The annular sleeve 19 is suitably constructed of Hastelloy D.

Arranged on and in contact with the packing ring 21 is an annular seating member 22 which is provided with a passageway 23 to allow flow from the inlet 15 to the outlet 16. The seating member 22 may be suitably constructed of corrosion resistant metal alloy such as Hastelloy D. The seating member 22 is provided with a seat 23a. It will be noted that the seating member 22 rests on the packing ring 21 and is in direct contact with the lead lining 17. Also the upper surfaces of the seating member 22 are in contact with the carbon liner 18. Thus in effect the seating member 22 floats between the carbon liner 18 and the packing ring 21 and is in contact with the lead liner 17. In no case does the seating member 22 contact the exposed surfaces of the valve body 11.

Arranged in the upper portion of the valve body 11 is a second annular sleeve 24 which also suitably may be constructed of Hastelloy D. This annular sleeve is a combination stem guide and stuffing box and has, like sleeve 20, a shoulder 25 which is designed to rest on the lead liner 17 extending over the flange 12. The annular sleeve 24 is constructed with an off-set portion 24a to provide as pace 25a in which is arranged chevron braided or shredded packing 26 which is suitably Teflon packing. Arranged in the space 25a above the packing 26 is a third annular sleeve or packing gland 27 which rests with its lower end in contact with the packing 26 and is suitably made of Hastelloy D. The inner surfaces of the sleeve 27 do not bind the extension member 31 as it slides through the sleeve 24. The packing gland holds the packing 26 in place and squeezes it against the extension member 31 to form an effective sliding seal.

Valve plug 29, which is suitably constructed of corrosion resistant high silicon metal, is arranged in valve body 11 and is provided with a surface 30 designed to seat on seat 23a. The extension member 31 is provided with a threaded portion 33 to which is attached motive means, such as a hand wheel 31a, for raising or lowering valve plug 29.

The annular sleeve 24 is held in the valve body 11 by means of a plate 35 which is connected to the flange 12 by means of threaded bolts 36. The annular sleeve 27 is held in valve body 11 by means of a plate 37 and bolts 38 which are threadably connected into the plate 35.

By adjusting the position of plate 37 relative to plate 35 by means of bolts 38, sleeve 27 may be moved into or out of contact with packing 26 to provide the desired sealing pressure between packing 26 and extension member 31.

The flanges 13 and 14 are provided with boltholes 39 and 40, respectively, to allow the control valve of the present invention to be connected into conduits or pipelines carrying sulfuric acid and other corrosive materials.

The improved valve of the present invention has numerous advantages and uses. It has mechanical strength for safety, mechanical and thermal shock resistance, and is inert to corrosive action of sulfuric acid (which may contain carbonaceous material) in all except extremely high concentrations and is particularly adaptable for controlling acid flow at elevated temperatures. The valve is economically constructed from readily available materials and may be easily repaired by conventional and readily available methods.

A valve such as described in conjunction with the drawing has functioned satisfactorily in a commercial sulfuric acid concentration operation over an extended period of time without requiring any maintenance.

The nature and objects of the present invention having been completely described and illustrated, what we wish to claim as new and useful and to secure by Letters Patent is:

1. An acid proof control valve provided with a body member having an inlet and an outlet and defining a flow passage for corrosive fluid, a corrosion resistant metal lining arranged in said valve body in contact with exposed surfaces thereof and extending through said inlet and outlet to the exterior of the valve body, a corrosion resistant porous liner arranged over the metal lining in the inlet and covering that part of the metal lining in the flow passage of the valve body, a corrosion resistant annular sleeve arranged in the outlet in direct contact with said metal lining, a corrosion resistant plastically deformable packing ring supported upon said annular sleeve in said valve body, a corrosion resistant annular valve seat member provided with an opening for passage of corrosive fluid from the interior of the valve body to the outlet arranged with a surface in contact with said packing ring and a surface in contact with said porous liner and in contact with said metal lining thereby positioning said seat member in the flow passage, a second corrosion resistant annular sleeve arranged in said valve body out of the passageway from the inlet to the outlet with its exposed surfaces in the valve body in contact with the porous liner and the metal lining, a corrosion resistant valve plug adapted to seat in said valve seat member having an extension member with a free end extending through said second annular sleeve to the outside of said valve body, said second annular sleeve defining a space with said extension member, a plastically deformable packing member arranged in said space surrounding the extension member and in contact with said second annular sleeve, a third corrosion resistant annular sleeve arranged in said space in contact with said packing member, and means for holding said second and third sleeves in said valve body.

2. An acid proof control valve with a body member having an inlet and an outlet at right angles to each other and defining a flow passage for corrosive fluid, a corrosion resistant deformable metal lining arranged in said valve body in contact with exposed surfaces thereof and extending through said inlet and outlet to the exterior of the valve body, a corrosion resistant carbon liner arranged over the deformable metal lining in the inlet and covering that part of the deformable metal lining in the flow passage of the valve body, a corrosion resistant metal annular sleeve arranged in the outlet in direct contact with said deformable metal lining, a corrosion resistant plastically deformable packing ring supported upon said annular sleeve in said valve body, a corrosion resistant annular valve seat member provided with an opening for passage of corrosive fluid from the interior of the valve body to the outlet arranged with a surface in contact with said packing ring and a surface in contact with said carbon liner and in contact with said deformable metal lining thereby positioning said seat member in the flow passage, a second corrosion resistant metal annular sleeve arranged in said valve body out of the passageway from the inlet to the outlet with its exposed surfaces in the valve body in contact with the carbon liner and the deformable metal lining, a corrosion resistant metal valve plug adapted to seat in said valve seat member having an extension member with a free end extending through said second annular sleeve to the outside of said valve body, said second annular sleeve defining a space with said extension member, a plastically deformable packing member arranged in said space surrounding the extension member and in contact with said second annular sleeve, a third corrosion resistant metal annular sleeve arranged in said space in contact with said packing member, means for holding said second and third sleeves in said valve body, and means for raising and lowering said extension member and said valve plug.

3. An acid proof control valve with a T-shaped body member having an inlet and an outlet at right angles to each other and defining a flow passage for corrosive fluid, a corrosion resistant lead lining arranged in said valve body in contact with exposed surfaces thereof and extending through said inlet and outlet to the exterior of the valve body, a corrosion resistant carbon liner arranged over the lead lining in the inlet and covering that part of the lead lining in the flow passage of the valve body, a corrosion resistant high silicon metal annular sleeve arranged in the outlet in direct contact with said lead lining, a corrosion resistant plastically deformable packing ring supported upon said annular sleeve in said valve body, a corrosion resistant high silicon metal annular valve seat member provided with an opening for passage of corrosive fluid from the interior of the valve body to the outlet arranged with a surface in contact with said packing ring and a surface in contact with said carbon liner and in contact with said lead lining thereby positioning said seat member in the flow passage, a second corrosion resistant high silicon metal annular sleeve arranged in said valve body out of the passageway from the inlet to the outlet with its exposed surfaces in the valve body in contact with the carbon liner and the lead lining, a corrosion resistant high silicon metal valve plug adapted to seat in said valve seat member having an extension member with a free end extending through said second annular sleeve to the outside of said valve body, said second annular sleeve defining a space with said extension member, a plastically deformable packing member arranged in said space surrounding the extension member and in contact with said second annular sleeve, a third corrosion resistant high silicon metal annular sleeve arranged in said space in contact with said packing member, means for holding said second and third sleeves in said valve body, and means for raising and lowering said extension member and said valve plugs.

References Cited in the file of this patent

UNITED STATES PATENTS

| | | |
|---|---|---|
| 895,302 | Robertson | Aug. 4, 1908 |
| 1,258,903 | Howard | Mar. 12, 1918 |
| 2,069,297 | Abercrombie | Feb. 2, 1937 |
| 2,223,242 | Sweet | Nov. 26, 1940 |
| 2,352,799 | Newton | July 4, 1944 |

OTHER REFERENCES

"The Chemical Age," vol. 6, Jan. 1, 1949, page 12 (TP-1-C36) published by Benn Brothers, Ltd., Bonverie House, 154 Fleet St., London, England.

"Metals Handbook," 1948 edition, page 1057 (TA-472-A3), published by American Society for Metals, 7301 Euclid Ave., Cleveland 3, Ohio.